United States Patent
Abitz et al.

(10) Patent No.: US 10,537,978 B2
(45) Date of Patent: Jan. 21, 2020

(54) METHOD AND APPARATUS FOR WHEEL MAINTENANCE

(71) Applicant: Gulfstream Aerospace Corporation, Savannah, GA (US)

(72) Inventors: Perry Abitz, Savannah, GA (US); Dan Cuff, Savannah, GA (US); Kyle Pihlstrom, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 191 days.

(21) Appl. No.: 15/878,030

(22) Filed: Jan. 23, 2018

(65) Prior Publication Data

US 2019/0224812 A1 Jul. 25, 2019

(51) Int. Cl.
*B24C 1/00* (2006.01)
*B64F 5/40* (2017.01)
*B64F 5/30* (2017.01)

(52) U.S. Cl.
CPC ............... *B24C 1/003* (2013.01); *B64F 5/30* (2017.01); *B64F 5/40* (2017.01)

(58) Field of Classification Search
CPC .... B24C 1/003; B64F 5/40; B64F 5/30; B64F 1/22; B60D 1/01; B60D 1/583; B60D 1/28; B60D 1/143; B60S 3/063; B60S 11/00; B60S 18/00; B60S 13/02; B24B 41/02
See application file for complete search history.

(56) References Cited

U.S. PATENT DOCUMENTS

| | | | | |
|---|---|---|---|---|
| 3,729,763 A | * | 5/1973 | Coley | B60S 3/042 |
| | | | | 15/53.4 |
| 4,317,476 A | * | 3/1982 | Radzik | B27L 7/04 |
| | | | | 144/194 |
| 6,540,470 B2 | | 4/2003 | Smith et al. | |
| 8,002,122 B2 | | 8/2011 | Kniegge | |
| 9,199,511 B2 | * | 12/2015 | Hodges | B60B 30/00 |
| 2002/0004961 A1 | * | 1/2002 | Nishina | A61G 5/10 |
| | | | | 15/53.4 |
| 2005/0015902 A1 | * | 1/2005 | Pulvermacher | A61G 5/10 |
| | | | | 15/53.4 |
| 2006/0124824 A1 | | 6/2006 | Taylor | |
| 2007/0138112 A1 | | 6/2007 | Meyer et al. | |
| 2010/0202862 A1 | * | 8/2010 | Kniegge | B25H 1/0014 |
| | | | | 414/430 |

* cited by examiner

*Primary Examiner* — Dung Van Nguyen
(74) *Attorney, Agent, or Firm* — LKGlobal | Lorenz & Kopf, LLP

(57) ABSTRACT

An apparatus for wheel maintenance includes a base configured to rotate about a vertical rotational axis and a frame mounted to the base that has a pair of opposing longitudinal members and a pair of opposing transverse members. First and second rollers are spaced apart from one another and coupled to the pair of opposing transverse members. Both the first and second rollers rotate about a longitudinal rotational axis orthogonal to the vertical rotational axis. In this way, when a wheel is positioned on the first and second rollers, the wheel may be rotated about the vertical rotational axis and a wheel rotational axis during a maintenance procedure.

20 Claims, 5 Drawing Sheets

METHOD AND APPARATUS FOR WHEEL MAINTENANCE

TECHNICAL FIELD

The present invention relates generally to maintenance for vehicle wheels and more particularly to a wheel maintenance device facilitating wheel cleaning maintenance procedures.

BACKGROUND

Contemporary aircraft are designed against strict performance specifications developed by an aircraft manufacturer to ensure safe and reliable air travel during the service life of the aircraft. Periodically, or from time-to-time, components of the aircraft must be replaced, repaired, inspected or refurbished before the aircraft or the component may be placed back into service. One example of such aircraft components are aircraft wheels. As will be appreciated, aircraft wheels may be placed under significant stress from time-to-time during landing maneuvers. Accordingly, aircraft wheels must be inspected, and if failing to meet all specifications, must be refurbished before returning to service. To inspect or repair an aircraft wheel, all surface coatings (e.g., paint or anti-rust coatings) and contaminants (e.g., dirt, oil, grease or rust) must be removed prior to inspection.

Generally, the aircraft industry, and other vehicle industries, prefers soda blasting (as opposed to other media blasting) to remove wheel surface coatings and contaminants. Soda blasting is a non-destructive process in which sodium bicarbonate is applied to a surface under compressed air. Soda blasting is a mild form of abrasive blasting since the sodium bicarbonate is an extremely friable material that micro-fragments on impact to remove surface materials without damage to the surface being cleaned.

Soda blasting is performed in a soda blast chamber, which is a self-contained system that includes a blast generator, high pressure compressed air, blast hose and blast nozzle. A technician performing a soda blast maintenance process stands outside the soda blast chamber and must reach into the soda blast chamber using long rubber gloves fixed to a sidewall of the soda blast chamber. Since aircraft wheels may weigh 50-65 pounds (22.68-29.5 kilograms), holding and maneuvering an aircraft wheel during a soda blasting procedure can be extremely tiring for the technician due to stresses applied to the technician's back, arms, hands or wrists.

Accordingly, it is desirable to provide a solution for the difficulties of soda blasting or other cleaning procedures on aircraft of other heavy vehicle wheels. It is further desirable that technician fatigue be reduced while affording greater ease of operation. Furthermore, other desirable features and characteristics will become apparent from the subsequent detailed description and the appended claims, taken in conjunction with the accompanying drawings and the foregoing technical field and background.

BRIEF SUMMARY

Various non-limiting embodiments of a wheel maintenance device are disclosed herein. In a first non-limiting embodiment, an apparatus for wheel maintenance includes a frame having a first pair of opposing rails and a second pair of opposing rails orthogonal to the first pair of opposing rails. A first roller is coupled at each end to the second pair of opposing rails and has a first rotational axis orthogonal to the second pair of opposing rails. A second roller is spaced apart from the first roller and coupled at each end to the second pair of opposing rails and has a second rotational axis coplanar with the first rotational axis. The frame and rollers are mounted to a rotating base for rotating the frame and first and second rollers about a third rotational axis orthogonal to the first and second rotational axes. In this way, a wheel positioned on the first and second rollers may be rotated about the first, second and third rotational axis by the rollers and the rotating base during a maintenance procedure.

In another non-limiting embodiment, an apparatus for wheel maintenance includes a base configured to rotate about a vertical rotational axis and a frame mounted to the base that has a pair of opposing longitudinal members and a pair of opposing transverse members. First and second rollers are spaced apart from one another and coupled to the pair of opposing transverse members. Both the first and second rollers rotate about a longitudinal rotational axis orthogonal to the vertical rotational axis. In this way, when a wheel is positioned on the first and second rollers, the wheel may be rotated about the vertical rotational axis and the longitudinal rotational axes during a maintenance procedure.

In another non-limiting embodiment, a method for wheel maintenance is disclosed. The method includes positioning the wheel on a wheel maintenance device having a base configured to rotate about a vertical rotational axis and a frame mounted to the base that has a pair of opposing longitudinal members and a pair of opposing transverse members. First and second rollers are spaced apart from one another and coupled to the pair of opposing transverse members. Both the first and second rollers rotate about a longitudinal rotational axis orthogonal to the vertical rotational axis. The method further includes rotating the wheel on the wheel maintenance device about the vertical rotational axis and the longitudinal rotational axes while performing a maintenance procedure on the wheel.

BRIEF DESCRIPTION OF THE DRAWINGS

The present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims.

A wheel maintenance device and method are disclosed herein. The wheel maintenance apparatus includes a base configured to rotate about a vertical rotational axis and a frame mounted to the base that has a pair of opposing longitudinal members and a pair of opposing transverse members. First and second rollers are and spaced apart from one another and coupled to the pair of opposing transverse members. Both the first and second rollers rotate about a longitudinal rotational axis orthogonal to the vertical rotational axis. In this way, when a wheel is positioned on the first and second rollers, the wheel may be rotated about the vertical rotational axis and may be spun about its own rotational axis during a maintenance procedure. The maintenance procedure may be material blasting (e.g., soda, aluminum oxide, plastic or glass media) blasting of paint and/or contaminants on the wheel. This permits the wheel to be manipulated in a manner that allows a worker to access every surface of the wheel without undue exertion.

A greater understanding of the wheel maintenance device and method may be obtained through a review of the illustrations accompanying this application together with a review of the detailed description that follows.

Figure 1:
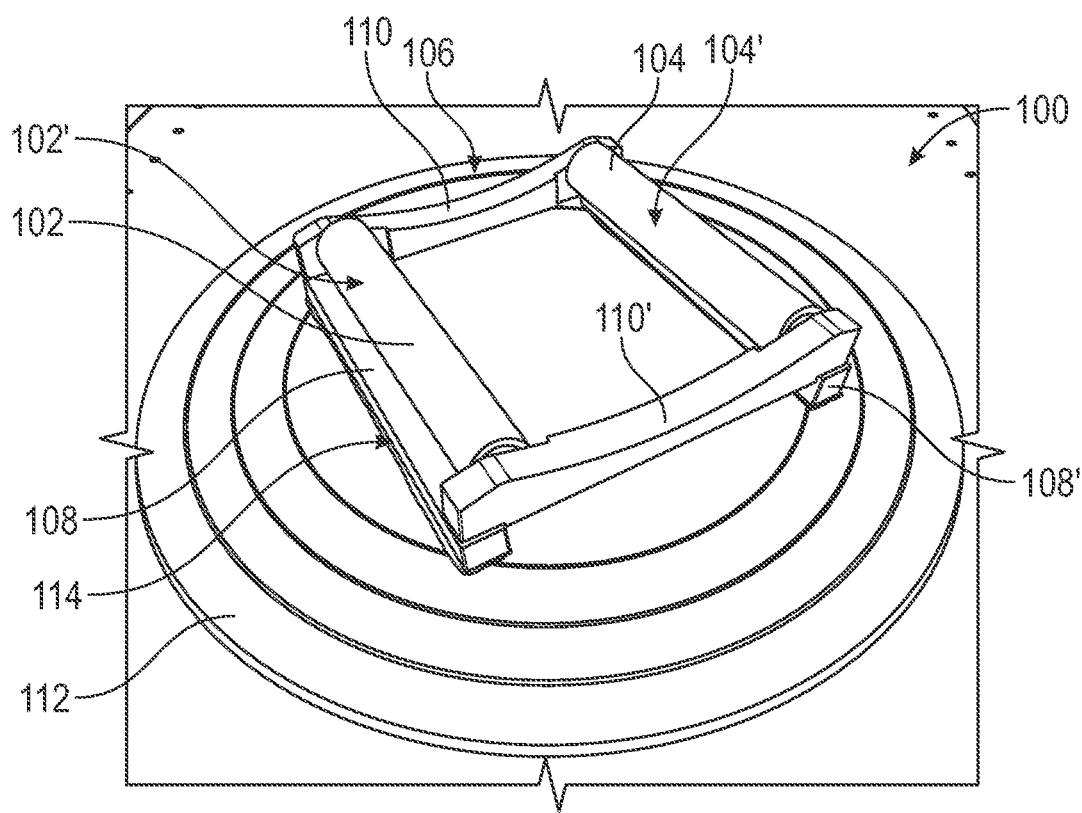
FIG. 1 is perspective view of a wheel maintenance apparatus in accordance with one non-limiting implementation.
Figure 2:
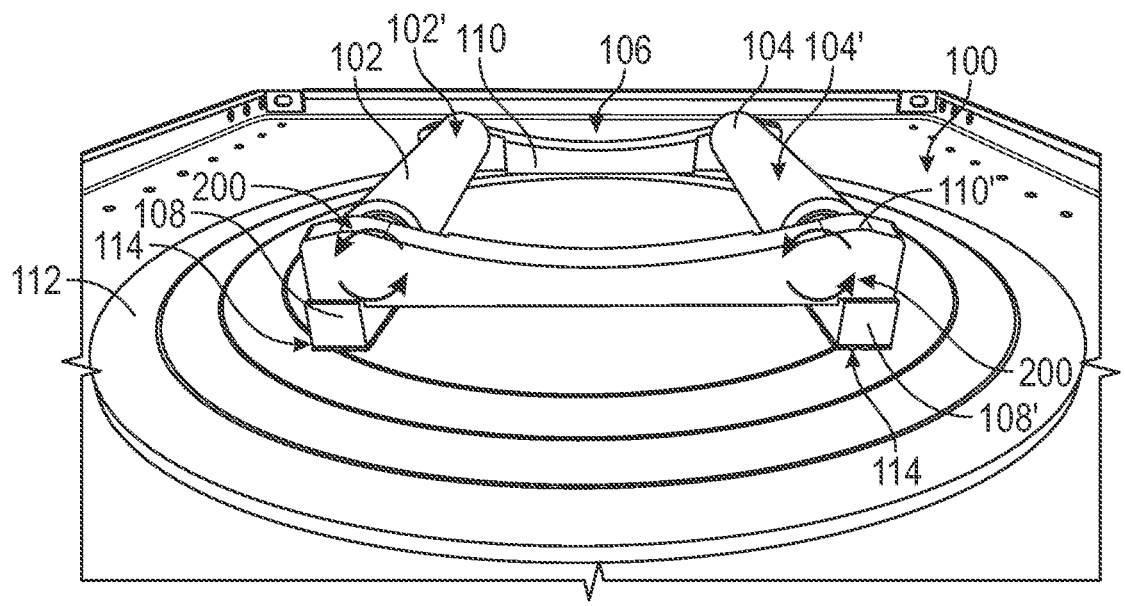
FIG. 2 is a side view of a wheel maintenance apparatus in accordance with one non-limiting implementation.
Figure 3:
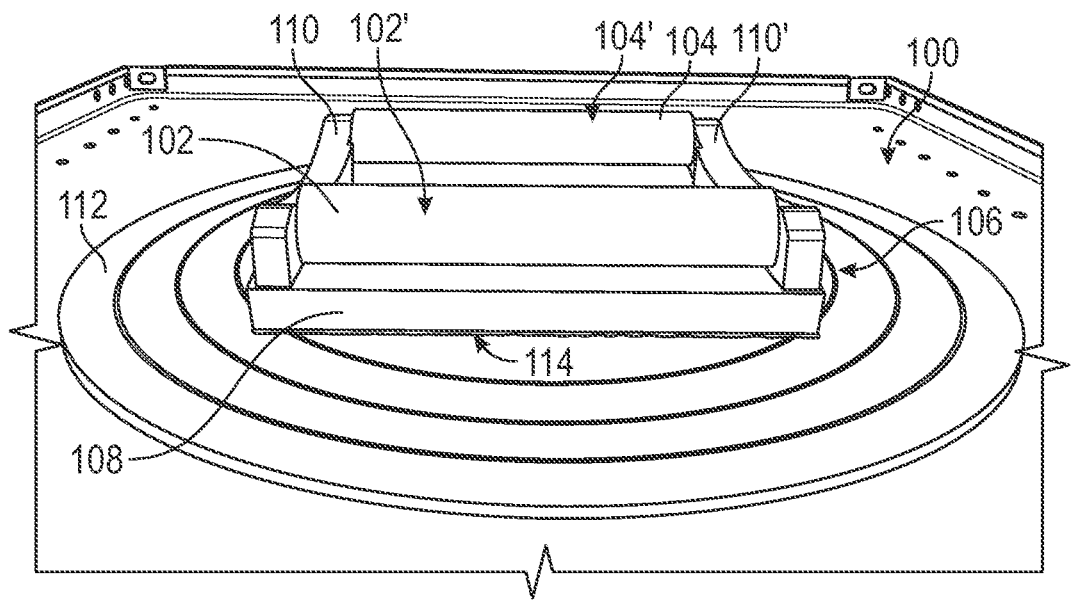
FIG. 3 is an end view of a wheel maintenance apparatus in accordance with one non-limiting implementation.
Figure 4:
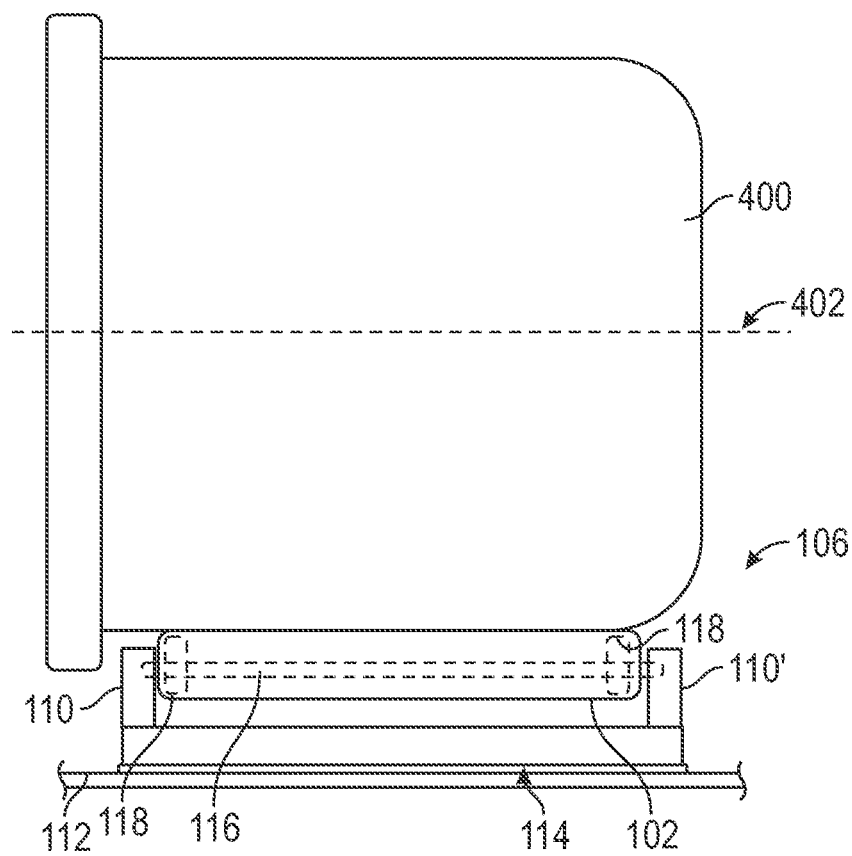
FIG. 4 is a transparent side view of a wheel maintenance apparatus in accordance with one non-limiting implementation.
Figure 5:
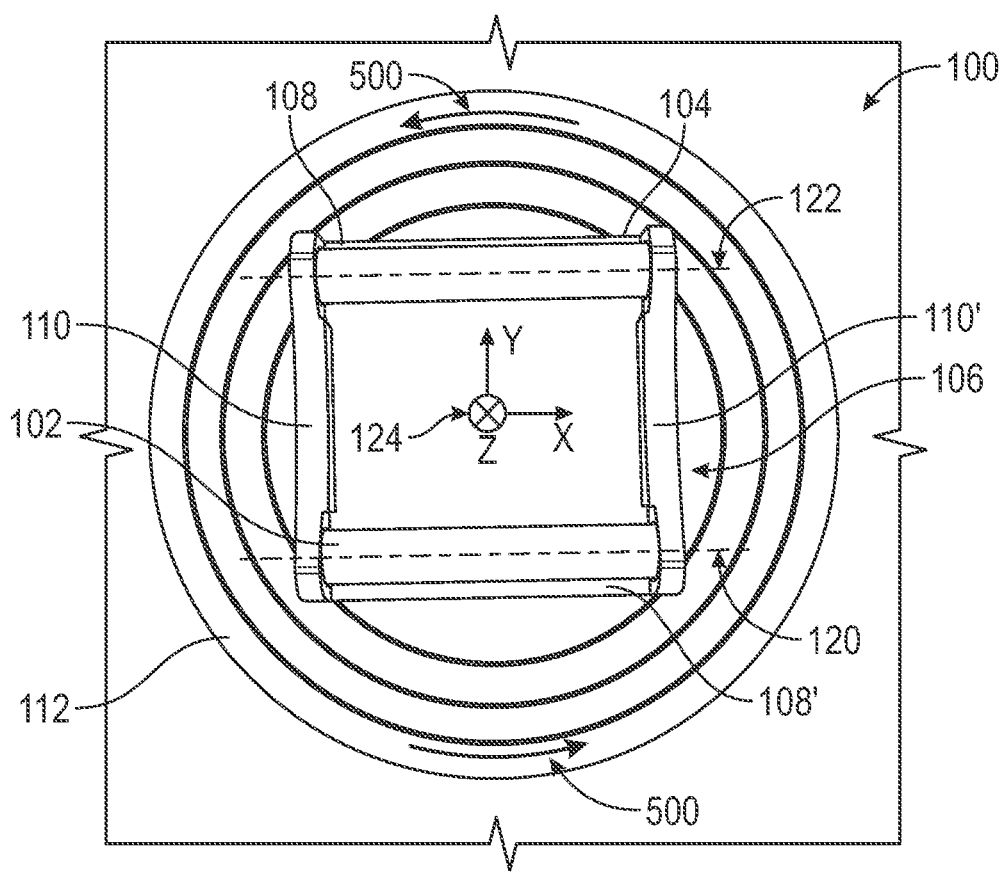
FIG. 5 is a top plan view of a wheel maintenance apparatus in accordance with one non-limiting implementation.

Referring now to FIGS. 1-5, various views of a wheel maintenance apparatus 100 are shown to facilitate an understanding of the advantages afforded by the present disclosure. In fundamental embodiments, the wheel maintenance apparatus (sometimes referred to as a wheel maintenance device or wheel roller) 100 receives a heavy aircraft or other vehicle wheel and permits a technician to easily rotate the wheel about various axes with one hand while performing a maintenance procedure (e.g., material blasting) with the other hand. The wheel being serviced is received on first roller 102 and a second roller 104. The rollers are mounted into a frame 106 that includes a first pair of opposing rails 108, 108' and a second pair of opposing rails 110, 110' to provide a substantially square shaped frame 106. In one exemplary embodiment, the frame 106 measures approximately 9×9 inches. However, as will be appreciated, the frame 106 could have any other general shape depending upon the wheel to be serviced. Non-limiting examples of frame shapes include rectangular, oval and round frame shapes. The first pair of opposing rails 108, 108' are considered to be longitudinal members of the frame 106 in that they lie along the same direction as the pair of rollers 102, 104. In some embodiments, the longitudinal members 108 have dimensions of 0.75 inch×0.75 inch×9 inches long. The second pair of opposing rails 110, 110' are considered to be transverse members of the frame 106 in that they are positioned orthogonal to the direction of the first and second rollers 102, 104. In some embodiments, the rollers 102, 104 have a length of 0.75 inches and a diameter of 1.25 inches. In some embodiments, the second pair of opposing rails 110, 110' (transverse members of the frame 106) have an arcuate shape substantially along an upper surface thereof as best seen in FIG. 2. In some embodiments, the transverse members 106 have dimensions of 0.75 inches wide×0.75 inches tall×9.5 inches long. In some embodiments, this arcuate shape is chosen to be substantially equal to an arc formed by the perimeter of the wheel to be serviced using the wheel maintenance device 100 (as will be discussed below in connection with FIG. 6). As will be appreciated, the first and second pair of opposing rails may be manufactured of any suitable material to support the weight of the wheel, and in some embodiments comprise a metal or metal alloy such as aluminum or an aluminum alloy. The frame 106, including the rollers 102, 104, is mounted to a base 112 that in fundamental embodiments is a rotating base or turntable (e.g., about 17.5 inches in diameter) that rotates about a central axis (the vertical or Z axis 124 as shown in FIG. 5). In some embodiments, the frame 106 is temporarily fixed to the rotating base 112 by a removable adhesive 114. This facilitates periodic service of the frame 106 and rollers 102, 104 by making them easy to remove from the rotating base 112. In other embodiments, the frame 106 may be mounted to the rotating base 112 by fasteners (not shown) to achieve a more permanent attachment.

Each of the first and second rollers 102, 104 rotate around an axle 116 supported by bearings 118 as best seen in FIG. 4. This provides the first roller 102 with a first rotational axis 120 (i.e., along the X axis as shown in FIG. 5) that is orthogonal to the vertical (or Z) axis 124 of the rotating base 120. Similarly, the second roller 104 has a second rotational axis 122 that is coplanar with the first rotational axis 120 and is also orthogonal to the vertical (Z or third) axis 124. The first and second rotational axes 120, 122 are said to be longitudinal axes as they are parallel to the longitudinal members 108, 108' of the frame 106. In this way, the first and second rollers 102, 104 allow for rotation of a wheel 400 positioned on the wheel maintenance device 100 about a wheel rotational axis 402 as the as the first and second rollers 102, 104 rotate as indicated by the arrows 200 in FIG. 2 and the rotating base 112 allows for rotation of the wheel 400 as indicated by the arrows 500 FIG. 5. Depending upon the shape of the wheel 400, the wheel rotational axis 402 may be parallel to the longitudinal axes (for a cylindrical wheel) or may not be parallel (for a frusto conical wheel). In any event, as the first and second rollers 102, 104 rotate about the respective longitudinal axes, the wheel 400 will rotate about its own rotational axis. In some embodiments, the first and second rollers 102, 104 have a compliant (e.g., rubberlike) covering 102', 104'. In other embodiments, the first and second rollers 102, 104 may have a textured covering to increase friction to hold the wheel during service. In some embodiments, the first and second rollers 102, 104 may be produced by three-dimensional printing as will be appreciated by those skilled in the art.

Figure 6:
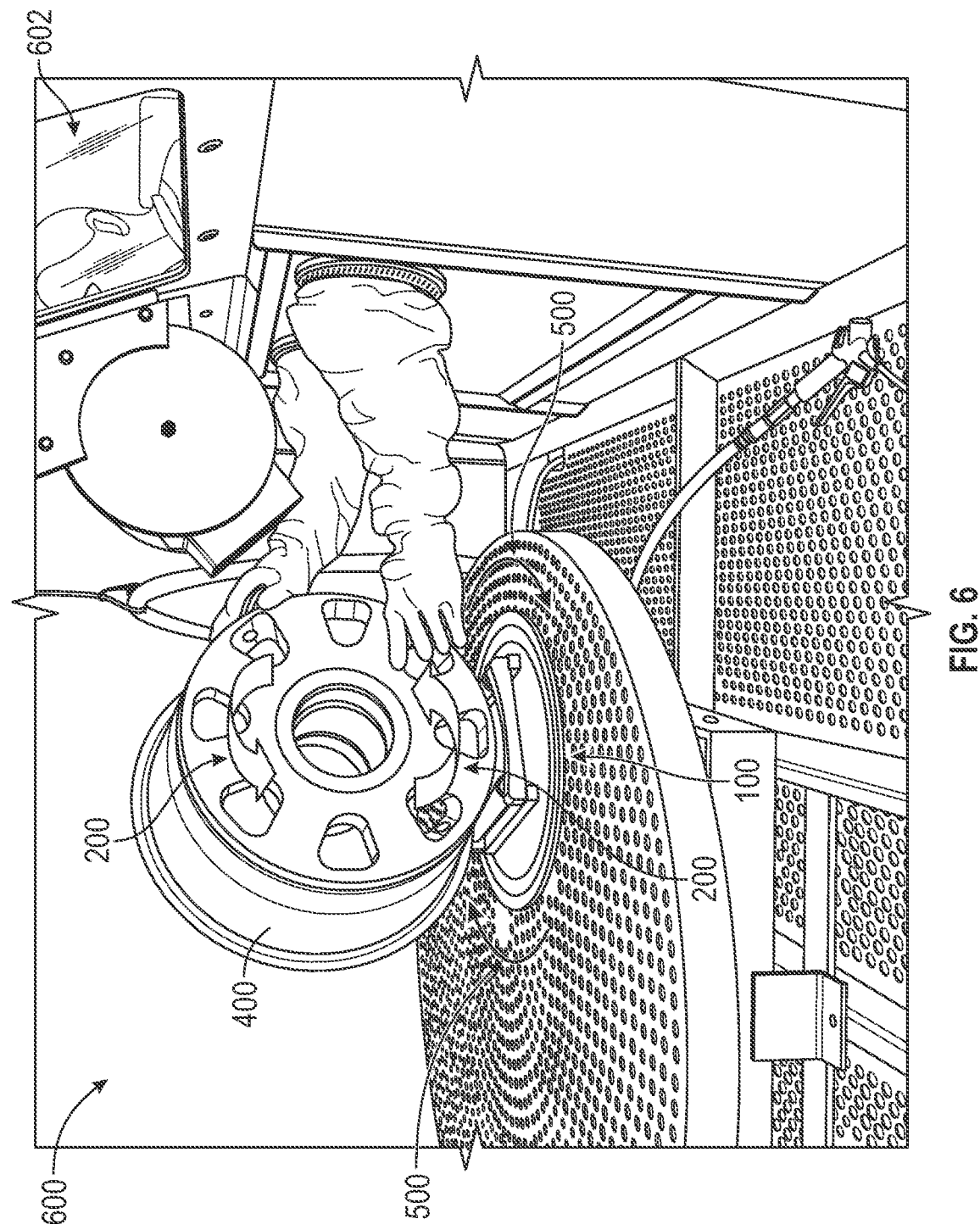
FIG. 6 is a perspective side view of a soda blasting chamber illustrating the advantages of a wheel maintenance apparatus in accordance with one non-limiting implementation.

With continued reference to FIGS. 1-5, FIG. 6 illustrates an aircraft wheel 400 positioned on the wheel maintenance device 100 inside a soda blast (in this example) chamber 600. As can be seen, the operator 602 is positioned outside the soda blast chamber 600, which is a self-contained system to keep the sodium bicarbonate captured within the soda blast chamber 6002. As noted above, the second pair of opposing rails 110, 110' (transverse members of the frame 106) may have an arcuate shape that, in some embodiments, is selected to be substantially equal to an arc formed by a perimeter of the wheel 400, as can be seen in FIG. 6. As will be appreciated, the technician 602 can easily rotate the wheel 400 about its own rotational axis 402 as indicated by the arrows 200 by virtue of the first and second rollers 102, 104, and also rotate the wheels in the direction indicated by the arrows 500 due to the rotation of the base 112. This affords the operator 602 with easy access to all surfaces of the wheel 600 to perform a material blasting maintenance procedure so that the aircraft wheel 400 may be inspected or refurbished. Due to the multi-axis rotation of the aircraft wheel 400 provided by the wheel maintenance device 100, operator fatigue is greatly reduced and efficiency in performing the maintenance procedure (e.g., soda blasting) is enhanced.

Figure 7:
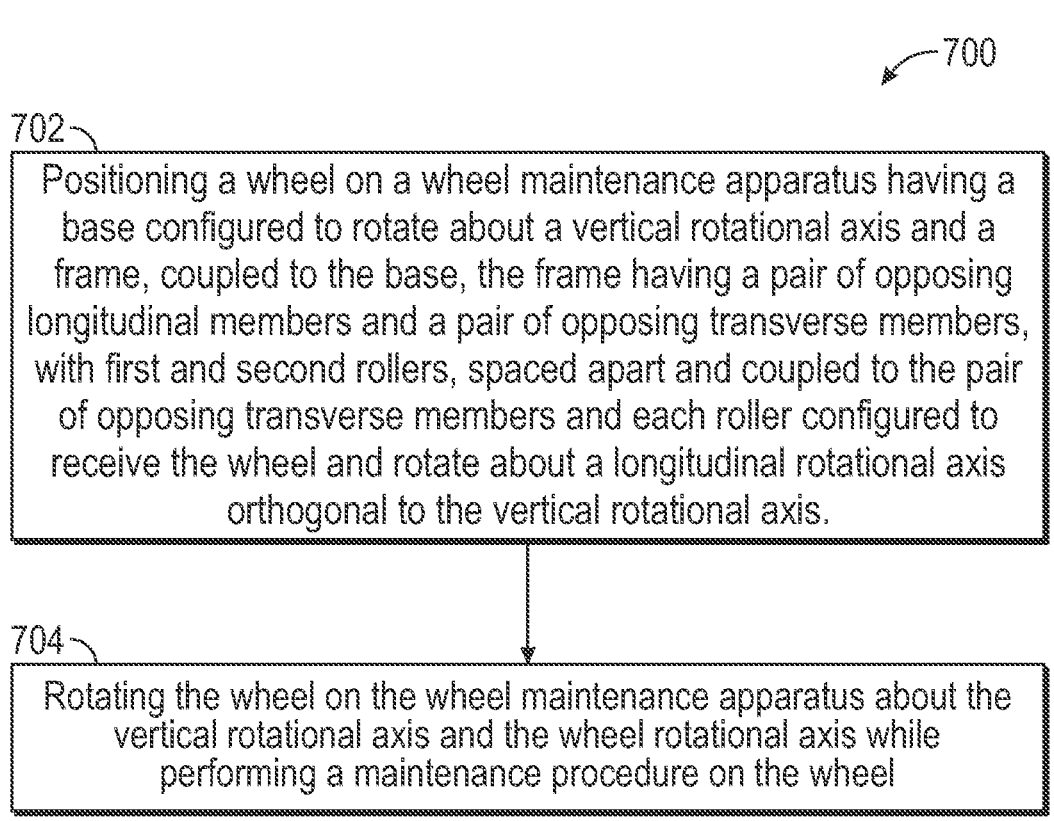
FIG. 7 is a flow chart describing a method for wheel maintenance using a wheel maintenance apparatus in accordance with one non-limiting implementation.

FIG. 7 describes a wheel cleaning method 700 using the wheel maintenance device 100 of the present disclosure. In block 702, the technician positions a wheel 400 on the wheel maintenance apparatus 100 that has a base 112 configured to rotate about a vertical axis 124 in a frame 106 that is coupled to the base 112 with the frame having a pair of opposing longitudinal members 108, 108' and a pair of opposing transverse members 110, 110' that support the first and second rollers 102, 104 that receive the wheel. After positioning the wheel 400 on the wheel maintenance apparatus 100, block 704 rotates the wheel 600 on the wheel maintenance apparatus 100 about the vertical rotational axis 124 and the wheel rotational axis 402 while the maintenance procedure is being performed on the wheel 600.

While the wheel maintenance apparatus 100 of the present disclosure has been described for convenience in the context of aircraft wheel maintenance, it will be appreciated that the advantages afforded by the wheel maintenance apparatus 100 are not limited to the aircraft industry. Indeed, the wheel maintenance apparatus 100 may find great applicability in other vehicular industries, non-limiting examples of which include the automobile industry, the truck industry, the recreational vehicle industry and the motorcycle industry.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for wheel maintenance, comprising:
    a frame having a first pair of opposing rails and a second pair of opposing rails orthogonal to the first pair of opposing rails;
    a first roller coupled at each end to the second pair of opposing rails and having a first rotational axis orthogonal to the second pair of opposing rails;
    a second roller spaced apart from the first roller and coupled at each end to the second pair of opposing rails and having a second rotational axis coplanar with the first rotational axis; and
    a rotating base coupled to the frame for rotating the frame and first and second rollers about a third rotational axis orthogonal to the first and second rotational axes;
    wherein, a wheel positioned on the first and second rollers may be rotated about a wheel rotational axis and the third rotational axis by the rollers and the rotating base during a maintenance procedure.

2. The apparatus of claim 1, wherein the frame has a substantially square shape.

3. The apparatus of claim 1, wherein the first and second opposing rails comprise metal or metal alloy members.

4. The apparatus of claim 1, wherein the rotating base comprises a turntable.

5. The apparatus of claim 1, wherein the frame is coupled to the rotating base via removable adhesive applied to the first pair of opposing rails.

6. The apparatus of claim 1, wherein the second pair of opposing rails has an arcuate shape substantially along an upper portion thereof.

7. The apparatus of claim 6, wherein the arcuate shape is approximately equal to an arc formed by a portion of a perimeter of the wheel.

8. The apparatus of claim 1, wherein the first and second rollers have a compliant covering.

9. The apparatus of claim 1, wherein the first and second rollers include bearings supported by an axle coupled to the second pair of opposing rails.

10. An apparatus for wheel maintenance, comprising:
    a base configured to rotate about a vertical rotational axis;
    a frame, coupled to the base, the frame having a pair of opposing longitudinal members and a pair of opposing transverse members; and
    first and second rollers, spaced apart and coupled to the pair of opposing transverse members and each configured to rotate about a longitudinal rotational axis orthogonal to the vertical rotational axis;
    wherein, when a wheel is positioned on the first and second rollers, the wheel may be rotated about the vertical rotational axis and a wheel rotational axes during a maintenance procedure.

11. The apparatus of claim 10, wherein the frame has a substantially square shape.

12. The apparatus of claim 10, wherein the pair of opposing longitudinal members and the pair of opposing transverse members comprise a metal or metal alloy.

13. The apparatus of claim 10, wherein the base comprises a turntable.

14. The apparatus of claim 10, wherein the frame is coupled to the base via removable adhesive applied to the pair of opposing longitudinal members.

15. The apparatus of claim 10, wherein the opposing transverse members have an arcuate shape substantially along an upper portion thereof.

16. The apparatus of claim 15, wherein the arcuate shape is approximately equal to an arc formed by a portion of a perimeter of the wheel.

17. The apparatus of claim 10, wherein the first and second rollers have a compliant covering.

18. The apparatus of claim 10, wherein the first and second rollers include bearings supported by an axle coupled to the opposing transverse members.

19. A method for performing maintenance on a wheel, comprising:
    positioning the wheel on a wheel maintenance apparatus comprising:
        a base configured to rotate about a vertical rotational axis;
        a frame, coupled to the base, the frame having a pair of opposing longitudinal members and a pair of opposing transverse members; and
        first and second rollers, spaced apart and coupled to the pair of opposing transverse members and each configured to receive the wheel and rotate about a longitudinal rotational axis orthogonal to the vertical rotational axis; and
    rotating the wheel on the wheel maintenance apparatus about the vertical rotational axis and a wheel rotational axes while performing a maintenance procedure on the wheel.

20. The method of claim 19, wherein the wheel is an aircraft wheel and the maintenance procedure comprises soda blasting the aircraft wheel.

\* \* \* \* \*